April 7, 1953  E. H. WITTENBERG ET AL  2,633,867
PRESSURE INDICATING AND RELIEF VALVE
Filed Oct. 2, 1944
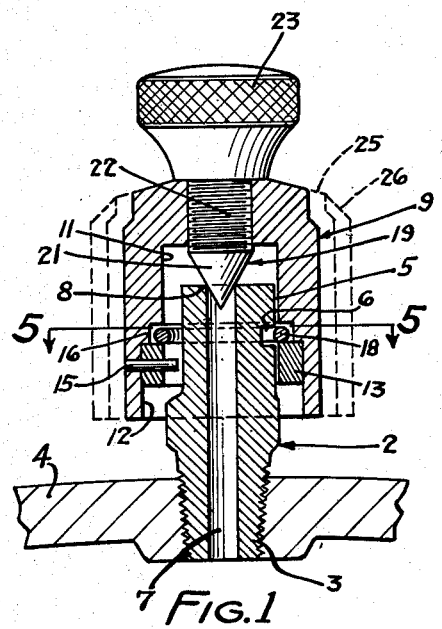
FIG.1
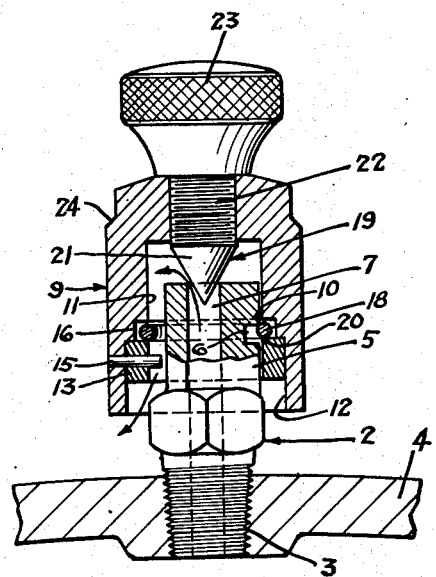
FIG.2
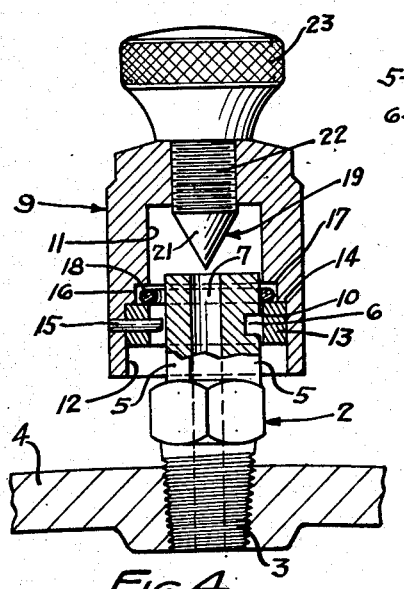
FIG.4
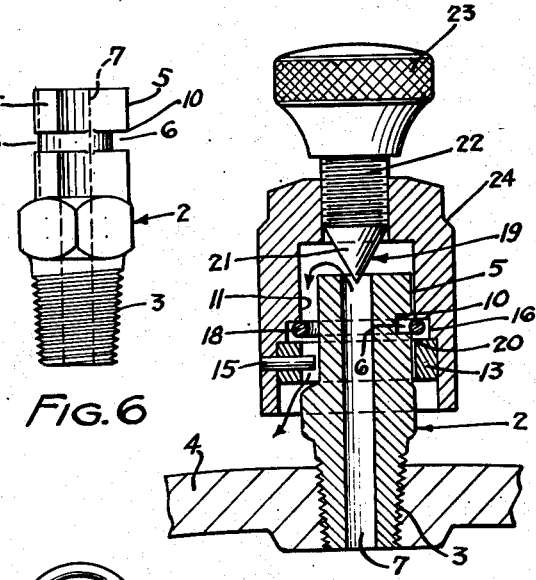
FIG.3
FIG.6
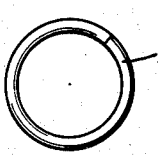
FIG.7
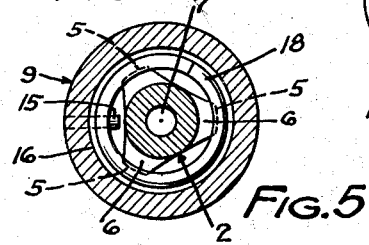
FIG.5
INVENTORS
EDWARD H. WITTENBERG
ARTHUR F. ALLEN
By Paul, Paul & Moore
ATTORNEYS Patented Apr. 7, 1953

2,633,867

UNITED STATES PATENT OFFICE 2,633,867

PRESSURE INDICATING AND RELIEF VALVE

Edward H. Wittenberg and Arthur F. Allen, Eau Claire, Wis., assignors to National Pressure Cooker Company, Eau Claire, Wis., a corporation of Wisconsin Application October 2, 1944, Serial No. 556,718

7 Claims. (Cl. 137—467)

This invention relates to new and useful improvements in pressure indicating and relief valve and more particularly to such a device adapted for use on a pressure cooker.

An object of the present invention is to provide a pressure indicating and relief valve (hereinafter frequently referred to, for convenience, as "valve") comprising a weighted body normally supported on a vent pipe secured in a wall of a pressure chamber, such as the cover of a pressure cooker, and means within said body for sealing the opening in the vent pipe to prevent escape of pressure from the pressure chamber, said valve being adapted to automatically release pressure from the pressure chamber when a predetermined pressure is attained therein, but being provided with means for preventing detachment of the valve body from the vent pipe under normal operating conditions.

A further object is to provide a valve of the foregoing type having a valve body having an axial bore therein for receiving the upper end of a vent pipe mounted in a wall of a pressure chamber, and an extensible ring mounted in a groove of the wall of said bore adapted to interlock with a groove or recess provided in the periphery of the vent pipe, thereby to limit axial movement of the valve body upon the vent pipe under normal operating conditions, such limited movement permitting pressure within the pressure cooker to unseat a valve member carried by the valve body when a predetermined pressure is attained within the pressure cooker, thereby to release excess pressure from the pressure cooker.

A further object is to provide a device of the class described comprising a valve body having an axial bore therein open at its lower end for receiving the upper end of a vent pipe mounted in a wall of a pressure cooker, and a valve member adjustably supported in the upper end of the valve body and normally engaging a seat in the upper end of the vent pipe to prevent the escape of pressure from the pressure chamber under normal operating conditions, and means between the valve body and the vent pipe for limiting axial movement of the valve body on the vent pipe, such limited movement permitting manual opening of the valve member, when necessary, and also permitting the valve body to be blown from the vent pipe should an excessive pressure suddenly develop within the pressure cooker body.

A further object is to provide a valve for pressure cookers which is substantially fool-proof in operation and which operates automatically to release pressure from the pressure cooker when a predetermined pressure is developed therein, whereby a constant pressure may be maintained within the pressure cooker, means also being provided for permitting the valve body to be blown off the vent pipe should the pressure within the pressure cooker reach a predetermined dangerous value, thereby to prevent damage to the cooker.

Other objects of the invention reside in the simple and inexpensive construction of the apparatus whereby it may be manufactured in quantity at small cost; in the provision of the snap-ring within the valve body which serves to limit the axial movement of the valve body on the vent pipe and also to prevent its detachment therefrom under normal operating conditions; in the provision of the valve member in the upper portion of the valve body whereby the pressure within the cooker may be released therefrom by manually unseating the valve member from the upper end of the vent pipe; and in the simple means provided for preventing relative rotation between the valve body and the vent pipe when the valve member is manipulated to open or close the upper end of the vent pipe.

Other objects, uses and advantages of the invention will appear from the following description, the accompanying drawings and the annexed claims.

In the accompanying drawings there has been disclosed a structure designed to carry out the various objects of the invention, but it is to be understood that the invention is not confined to the exact features shown, as various changes may be made within the scope of the claims which follow.

In the drawing:

Figure 1 is a sectional elevation of the pressure indicating and relief valve of our invention showing it in normal operating condition wherein the valve member is sealingly engaged with the upper end of the vent pipe;

Figure 2 is a view similar to Figure 1, but showing the valve member unseated by fluid-pressure to permit the escape of pressure from the cooker;

Figure 3 is a view showing the valve member partially unscrewed to unseat said member from the upper end of the vent pipe to release pressure from the pressure cooker;

Figure 4 is a view showing the snap-ring expanded to permit complete detachment of the valve body from the vent pipe, as when a pre- Figure 5 is a cross sectional view on the line 5—5 of Figure 1;

Figure 6 is a view showing the vent pipe removed from the cover of the cooker; and Figure 7 is a view showing the snap-ring detached from the valve body.

The novel pressure release valve herein disclosed is shown comprising a vent pipe 2 having a threaded end portion 3 adapted to be received in a threaded socket provided in the cover 4 of a pressure cooker. The upper portion of the vent pipe is formed with a plurality of longitudinal ribs 5 each provided with a horizontal recess 6, as clearly illustrated in the drawing. A fluid passage 7 extends lengthwise through the vent pipe and terminates at its upper end in a seat 8.

A valve body, generally designated by the numeral 9, is shown provided with an axial bore 11 which is open at its bottom to receive the upper portion of the vent pipe, as illustrated in Figures 1 to 4, inclusive. The lower portion of the bore 11 is counter-bored or enlarged, as shown at 12 in the drawing, to receive a retaining-ring 13 which is seated against a shoulder 14 and secured in such position by a suitable pin 15, shown passing through an aperture provided in the wall of the valve body 9.

A relatively smaller counter-bore 16 is provided between the counter-bore 12 and the bore 11 which, with the upper face of the retaining ring 13, provides an annular groove 17 adapted to receive a split snap-ring 18.

The inside diameter of the snap-ring 18 is slightly less than the outer diameter of the ribs 5 of the vent pipe, whereby when the valve body 9 is fitted onto the upper end of the vent pipe, the snap-ring 18 must slightly expand in order to pass over the upper ends of the ribs 5 into the annularly disposed recesses 6 provided in the ribs of the vent pipe as shown in Figure 1. The mean diameter of the snap-ring 18 coincides substantially with the diameter of the bore 11, and the outside diameter of the ribs of the upper end of the vent pipe is such as to loosely fit into the bore 11, as indicated in the drawing. The snap-ring 18 is, however, of such size that when the parts are assembled as shown in Figures 1, 2 and 3, the snap-ring limits the relative movement of the valve body upon the vent pipe and prevents the valve body from accidently becoming detached from the vent pipe should the cover be inverted.

A valve member, generally designated by the numeral 19, is shown provided with a tapered terminal 21 adapted to engage the seat 8 provided at the upper end of the vent pipe. The valve member has a threaded portion 22 received in threaded engagement with the upper portion of the valve body 9 and is provided with a finger knob 23 whereby the valve member may conveniently be manipulated to move its terminal 21 into or out of engagement with the seat 8 as will be understood. When the valve member is rotated by manipulation of the knob 23, the pin 15 whose inner end is received between adjacent ribs 5 of the vent pipe, prevents relative rotation of the valve body on the vent pipe as will be best understood by reference to Figure 5, whereby the valve member may readily be moved into or out of engagement with its seat by manual manipulation of the knob 23.

In the normal operation of a pressure cooker provided with a pressure indicating and relief valve such as herein disclosed, the parts are initially positioned as shown in Figure 1, wherein it will be noted that the entire weight of the valve body is supported upon the valve seat 8 as result of the valve member 21 being in engagement therewith. Should it become desirable to release atmospheric air from the pressure cooker upon initial starting thereof, the valve member may be unseated to the position shown in Figure 3, whereupon the interior of the pressure cooker is in direct communication with the atmosphere through the passage 7 and the bores provided in the valve body 9. To develop pressure within the pressure cooker the valve tip 21 must be screwed downwardly to the position shown in Figure 1, whereby it will sealingly engage the seat 8 and thus prevent further escape of pressure from the cooker body.

When the pressure within the cooker body reaches a predetermined value, the valve body 9 is moved upwardly by the pressure within the cooker as shown in Figure 2, whereby the valve tip 21 is partially unseated to permit excess pressure within the cooker body to escape to the atmosphere as indicated by the arrows. When the valve body is thus elevated by fluid pressure against the valve tip 21, the snap-ring 18 limits its upward movement or the opening of the valve member 21 as a result of the snap-ring engaging the upper corners 10 of the recesses 6 in the vent pipe, it being understood that the ring 18 is carried upwardly with the valve body 9 because of normally being seated upon the inner corner 20 of the retaining-ring 13, as clearly shown in Figure 2. Such partial opening of the valve is sufficient to permit adequate escape of pressure from the cooker whereby a constant cooking pressure may be maintained therein.

When cooking and processing certain kinds of foods, as, for example, cranberries, split peas, cereals, and the like, which have a tendency to swell more or less during the cooking process and which may also "fluff up" or bubble more or less, particles of such foods may enter the passage 7 in the vent pipe and temporarily clog or obstruct it, so that under normal operating conditions the pressure within the cooker cannot actuate the valve member 19 when the predetermined maximum cooking pressure is attained within the pressure cooker. Under such conditions the pressure within the cooker body may eventually rise to a sufficiently dangerous value as to suddenly blow the obstruction out of the passage in the vent pipe, which action will unseat the valve member 19 and permit the escape of such excess pressure to the atmosphere.

Experiments have shown that when the passage 7 in the vent pipe becomes clogged, it may require from forty-five to fifty pounds pressure in the cooker body to blow such obstructions out of the vent pipe. Such sudden release of the pressure in the cooker through the vent pipe might cause considerable damage, were the valve body 9 loosely supported upon the vent pipe whereby it could readily be blown therefrom.

In the novel pressure indicating and relief valve herein shown, the valve body cannot be blown from the vent pipe except under extreme conditions when it may become necessary to remove it therefrom to prevent bursting of the pressure cooker body as a result of dangerously high internal pressures. To permit the valve body to be blown from the vent pipe under such extreme or unusual conditions, the snap-ring 18 is designed to expand and pass over the upper portions of the ribs 5 of the vent pipe 2, as shown in Figure 4, when the pressure within the cooker reaches approximately sixty-five pounds, which is well within the pressure required to burst the cooker body.

Thus, should the congestion in the vent pipe become so complete as to permit a pressure approximately sixty-five pounds to develop within the cooker body, then the snap-ring 18 will expand and pass over the upper rib portions of the vent pipe as hereinbefore stated, and thereby release the valve body from the vent pipe.

Experience has shown that in most all cases obstructions accumulating in the vent pipe are ejected therefrom before the pressure within the pressure cooker reaches approximately sixty-five pounds, but should it exceed that pressure the snap-ring 18 expands and releases the valve body as above stated. By so designing the snap-ring the valve body will rarely be blown from the vent pipe, which is a very desirable feature in that it greatly reduces the possibility of damage to property or injury to persons which may be about the pressure cooker when it is in operation.

The body 9 of the valve is provided at its upper portion with an annular shoulder 24 adapted to support an outer sleeve-like weight 25 indicated in dotted lines in Figure 1. A similar sleeve 26 may also be telescoped over the sleeve 25 whereby the pressure indicating and relief valve may be adjusted for various maximum cooking pressures, as will be understood.

It will be understood that the snap-ring and related portions of the pressure indicating and relief valve may be so constructed as to permit release of the valve body from the vent pipe at pressures other than 65 pounds having regard to the caution that the release pressure selected should lie substantially below the bursting point of the vessel. The pressures mentioned are, therefore, given only by way of example and not by way of limitation.

It will be apparent to those skilled in the art that the embodiments herein described may be variously changed and modified without departing from the spirit of the invention, and that the invention is capable of uses and has advantages not herein specifically described. Hence it will be appreciated that the herein disclosed embodiments are illustrative only, and that our invention is not limited thereto.

We claim as our invention:

1. A pressure indicating and relief valve comprising, in combination, a vent pipe adapted to be secured in a wall of a pressure vessel to provide communication with the interior of the vessel, a body having a bore therein for receiving the upper end of the vent pipe, a valve member in the bore of said body adapted to seat upon the open end of the vent pipe to seal it, and a releasable interlock between the body and the vent pipe, said interlock including cooperating structures associated, respectively, with the body and the vent pipe, said structures being of such relative dimensions that they accommodate but limit movement of said body and valve member away from the open end of the vent pipe in response to fluid pressures in the vent pipe within a predetermined range, said structures including resilient means accommodating complete separation of the body and valve member from the vent pipe in response to fluid pressures in the vent pipe in excess of said predetermined range of pressures.

2. In a pressure indicating and relief valve, in combination, a hollow stem member having a valve seat, a cap member telescoped over the stem member and carrying a fluid pressure releasable valve member adapted to rest upon said valve seat, there being a recess in the surface of each of said members facing the other member, an interlocking element carried in the recess of one of said members and having a rounded portion projecting into the recess in the other of said members, one of said recesses being wider than said projecting portion whereby the members have permissible play endwise of each other to allow the valve to unseat under a predetermined fluid pressure, said rounded projecting portion being yieldable whereby fluid pressure endwise of the cap exerting a predetermined force in excess of that of said predetermined fluid pressure is effective to force said projecting portion to ride out of said one recess to accommodate separation of the cap from the stem.

3. A pressure indicating and relief valve comprising, in combination, a vent pipe adapted to be secured in the wall of a pressure vessel to provide a communication with the interior of the vessel, a body having a bore therein for receiving the upper end of the vent pipe, an adjustable valve member in said bore adapted to seal the open end of the vent pipe by resting thereon, and an interlock between the body and the vent pipe, said interlock including cooperating structures associated, respectively, with the body and the vent pipe with said structures being of such relative dimensions that they are adapted to accommodate but normally limit axial movement in either direction of the body and its valve member relative to the vent pipe, said structures including resilient means adapted to accommodate movement of the body and its valve member in one direction relative to the vent pipe beyond the limit normally defined by said structures, said valve member being adapted to be adjusted relative to the body whereby the valve is unseated from the vent pipe and the body is supported on the vent pipe by the interlock.

4. The combination of claim 3 wherein a second interlock is provided between the body and the vent pipe, said second interlock including cooperating structures associated respectively with the body and the vent pipe with said structures being of such relative dimensions that they limit relative rotation between said body and said vent pipe.

5. A pressure indicating and relief valve comprising, in combination, a vent pipe adapted to be secured in a wall of a pressure vessel to provide communication with the interior of the vessel, a body having a bore therein for receiving the upper end of the vent pipe, a valve member in the bore adapted to seal the open end of the vent pipe by resting thereon, the weight of the body and valve member preventing the escape of the fluid under pressure in the vent pipe until a predetermined operating pressure is achieved, and an interlock between the body and the vent pipe, said interlock comprising a split ring seated partially in a groove in the exterior of the vent pipe and partially in a groove in the inner wall of the body, one of said grooves being wider axially than the thickness of the ring thereby permitting limited axial movement of the body and valve member relative to the vent pipe in response to fluid pressures within a predetermined range, said ring disengaging from one of said grooves in response to fluid pressures in excess of said predetermined range of pressures whereby the body and valve member may be separated from the vent pipe.

6. A pressure indicating and relief valve comprising, in combination, a vent pipe adapted to be secured in a wall of a pressure vessel to provide communication with the interior of the vessel, a body having a bore therein for receiving the upper end of the vent pipe, a valve member in the bore adapted to seat upon the open end of the vent pipe to seal it, the weight of the body and valve member preventing the escape of the fluid under pressure in the vent pipe until a predetermined operating pressure is achieved, and an interlock between the body and the vent pipe, said interlock comprising an expansible split ring the mean diameter of which corresponds to the bore in the body, said ring being seated partially in a horizontally disposed groove in the vent pipe and partially in a horizontally disposed groove in the body, both of said grooves being wider axially than the thickness of the ring thereby permitting limited axial movement of the body and the valve member relative to the vent pipe in response to fluid pressures within a predetermined range, said ring being adapted to be engaged between an upper edge of one groove and the lower edge of the other groove when the fluid pressures of said predetermined range exist and being adapted to be cammed out of the groove in the vent pipe when said predetermined range of pressures is exceeded, whereby the interlock is released and the body and valve member may be completely separated from each other.

7. A pressure indicating and relief valve comprising, in combination, a vent pipe adapted to be secured in the cover of a pressure vessel to provide communication with the interior of said vessel, a body having a bore therein for receiving the upper end of the vent pipe, an axial passageway being provided in the exterior of the vent pipe to permit the discharge of the fluid under pressure from the bore, an adjustable valve member having threaded engagement with the body at the bottom of the bore and being adapted to seat upon the open end of the vent pipe, the weight of the body and valve member sealing the vent pipe to prevent discharge of fluid under pressure until a selected operating pressure has been achieved, a horizontally disposed groove in the exterior of the vent pipe, a horizontally disposed groove in the inner wall of the body, an interlock comprising a split ring partially seated in each of said grooves, said grooves being wider axially than the thickness of the ring to provide limited axial movement of the body and valve member relative to the vent pipe, the groove in the wall of the body being formed by a recessed portion of the bore of said body and a retainer ring seated in a counterbore in the body, a pin carried by the body fixing said retainer ring against movement and extending into the axial passageway on the exterior of the vent pipe to limit rotation of the body relative to the vent pipe, said split ring being adapted to limit the extent of movement of the body and valve member relative to the vent pipe when a predetermined range of fluid operating pressure exists and being adapted to be cammed from its interlocking position when fluid pressure in excess of the predetermined range of operating pressures exists, whereby the body and valve member may be completely disassociated from the vent pipe.

EDWARD H. WITTENBERG.
ARTHUR F. ALLEN.

REFERENCES CITED

The following references are of record in the file of this patent:

UNITED STATES PATENTS

| Number | Name | Date |
|---|---|---|
| 37,795 | Steinmetz | Feb. 24, 1863 |
| 821,624 | Edison | May 29, 1906 |
| 833,559 | Stebbins | Oct. 16, 1906 |
| 858,131 | Aichele | June 25, 1907 |
| 875,481 | Wilson | Dec. 31, 1907 |
| 1,428,745 | Bayles | Sept. 12, 1922 |
| 1,519,604 | Costello | Dec. 16, 1924 |
| 1,834,837 | Hashimoto | Dec. 1, 1931 |
| 1,998,444 | Clapp | Apr. 23, 1935 |
| 2,107,704 | Kronquest | Feb. 8, 1938 |
| 2,428,483 | Wittenberg | Oct. 7, 1947 |
| 2,540,583 | Ives | Feb. 6, 1951 |

FOREIGN PATENTS

| Number | Country | Date |
|---|---|---|
| 673 | Great Britain | of 1881 |
| 4,081 | Great Britain | of 1881 |
| 78,173 | Austria | of 1919 |
| 230,049 | Switzerland | of 1944 |